United States Patent Office 2,696,306
Patented Dec. 7, 1954

2,696,306

FILTER AID

Paul L. Gomory, Bethesda, Md., assignor to Phillips Petroleum Company, a corporation of Delaware No Drawing. Application December 27, 1949, Serial No. 135,307

11 Claims. (Cl. 210—42.5)

This invention relates to an improved process for filtering a solid from a liquid. In one of its aspects, this invention relates to a method for preparing a filter aid in situ in a material to be filtered. In another of its aspects, this invention relates to a method for preparing a filter aid from a suitable fluid or liquid and for obtaining a uniform dispersion of such filter aid throughout a material to be filtered. In still another of its aspects, this invention relates to an improved method for filtering an aqueous mother liquid from a crystalline inorganic compound, for example, a calcium hypochlorite.

In the prior art, it is conventional to employ a filter aid in the separation of liquids from solids by means of filtration. The filter aid is admixed with the material to be filtered before the latter is passed to a filtering mechanism, usually comprising a porous medium which retains the solids of the material filtered thereon while permitting the mother liquor to pass through. The purpose of such filter aid is generally two-fold. One purpose is to provide a supplementary porous media which collects with the solids from the material filtered to increase the porosity of the resulting filter cake. The increased porosity of the filter cake, in turn, permits the accumulation of a thicker filter cake than would be possible in the absence of a filter aid before clogging of the filter screens, cloths, beds, etc. of the filtering mechanism occurs. The increased porosity of the filter cake will also concomitantly prevent excessive crushing of the solids by decreasing the differential pressure required across the filter cake to force the mother liquor through the filtering mechanism. Another purpose of the filter aid, which can be complementary or alternative to the first purpose, is to form a surface coating on the filter screens, cloths, beds, etc. of the filtering apparatus which will reduce the amount of finely-divided solids from the material being filtered which pass through the filtering mechanism with the filtrate. Thus, the filter aid can serve to augment the filtering function of the filter screens, cloths, beds, etc. of the filtering mechanism.

Ordinarily in the prior art, the filter aid is first prepared separately and independently from the filtration process in a solid form and then is admixed with the material to be filtered. Thus, diatomaceous earth, a commonly used filter aid, is secured as a solid and then is admixed with the material to be filtered. The same is true for other filter aids, such as wood pulp, various finely-divided clays, kieselguhr, etc. In order to be fully effective in increasing the efficiency and ease of a filtration process, the filter aid must be thoroughly and uniformly admixed with the material to be filtered in order to ultimately provide a uniform filter cake through which the mother liquor can pass at the desired rate without having local areas therein where little, if any, filtration can be secured. Obviously, the large amount of physical stirring and mixing required to obtain a uniform dispersion of a filter aid which has been added as a solid to the materials to be filtered can result in substantial attrition and at least some disintegration of the filter aid particles themselves as well as of the solids in the material to be filtered. This is undesirable because it increases the amount of solid "fines" in the material to be filtered thereby making efficient filtration difficult, if not impossible to obtain. Hence, the physical act of admixing a solid filter aid uniformly with the material to be filtered, while necessary for most efficient filtration, will cause a lessening of the filtering efficiency through attrition and disintegration. A compromise is usually necessary between these two somewhat mutually exclusive considerations and as a result, the maximum filtration efficiency is not obtained.

It has now been found that a uniform admixture of a filter aid with a material to be filtered can be easily and readily effected without attrition of the filter aid by admixing a fluid capable of forming a solid filter aid with the material to be filtered and then causing the filter aid to form in situ in the material to be filtered. Thus, a suitable fluid or liquid which is capable of forming a solid when properly treated, can be uniformly admixed with, or dispersed throughout, the material to be filtered with a minimum of attrition of any solid particles and then, the filter aid can be formed by solidifying the said fluid or liquid in said material. For example, an aqueous suspension of a crystalline salt can have liquid benzene admixed therewith by appropriate means and upon cooling, a crystalline benzene filter aid can be formed in situ. The resulting suspension of salt and solidified benzene filter aid can be filtered in a conventional manner providing only that the temperature is maintained below the melting point of the benzene filter aid. Some salts are extremely difficult to filter due to their crystalline shapes, for example, a calcium hypochlorite is formed, at least in some cases, in the shape of substantially flat hexagonal crystals or plates which lie upon each other. Such a mass of crystals requires great filtering pressures which can be supplied only by special filtering machines which constitute a major item of expense and also limit the rate of production. Numerous advantages are derived from adding a fluid or liquid to the material to be filtered and forming a solid filter aid in situ as compared with adding a solid filter aid to a material to be filtered. Thus, attrition of the filter aid particles and of the solid particles in the mixture to be filtered is substantially avoided while achieving uniform admixture of the filter aid with the material to be filtered. Further, the size of the filter aid employed can be controlled and varied to meet changing conditions merely by controlling the extent of dispersion or size of the fluid or liquid globules or droplets which are formed when the fluid or liquid is admixed with the material to be filtered. Also, it is much simpler to handle the liquids which are to form the filter aid than a solid filter aid. Still further, the recovery of the filter aid from the filtered product is easily accomplished by merely causing the solid filter aid to become a fluid again which can be reused indefinitely.

Thus, according to this invention, there is provided a process for forming a uniform admixture of a filter aid with a material to be filtered comprising admixing a fluid or liquid capable of forming a substantially immiscible filter aid in situ with a material to be filtered and then causing the fluid or liquid to solidify as discrete particles which form the desired filter aid. Still according to this invention, there is provided a method of forming a filter aid in situ in a material to be filtered which comprises uniformly dispersing a liquid which is immiscible in the material to be filtered and which is capable of being solidified as the desired filter aid, into the material to be filtered and then solidifying the said liquid to form the desired uniformly dispersed filter aid in the material to be filtered without any substantial attrition or disintegration of the filter aid or of the solids in the material to be filtered. Still further according to this invention, there is provided a method for forming a uniform dispersion of a filter aid throughout an aqueous suspension of a crystalline salt without causing any substantial attrition of the filter aid particles or of the salt crystals which comprises dispersing into said suspension an organic liquid which is capable of forming a solid at a temperature above the freezing point of the said suspension of salt crystals and which is substantially immiscible with said suspension and then cooling said liquid and causing to form the desired filter aid.

The present invention involves the steps, in the separation of solids from a liquid with the assistance of a filter aid by passing the liquid through a porous medium, i. e. by filtration of admixing with or dispersing in the material to be filtered a liquid which is substantially immiscible with the said material to be filtered and which is capable of being solidified to form the desired filter aid in situ and then causing the liquid to solidify. The material to be filtered then contains a uniformly dispersed filter aid and can be filtered in a conventional manner, for example, in filter presses, filter beds, or centrifuges, providing the filter aid is maintained as a solid. The filter aid then can readily be separated from the resulting filter cake my merely liquefying it so that it can be decanted, skimmed, settled, etc. from the product solids of the filter cake.

In accordance with this invention, the liquid which is to be admixed with the material to be filtered to form a filter aid in situ therein should be substantially immiscible with the material to be filtered. A substantially immiscible liquid can form discrete bodies of liquid in the material to be filtered when properly admixed therewith and each of these bodies can be solidified by appropriate means to form the individual particles of filter aid. The immiscible fluid or liquid can be selected from a class of substances or compounds which have melting points above the freezing temperature of the liquor to be filtered. Preferably, the liquid should have a freezing point at least 5° and still more preferably at least 10° C. above the freezing point of the material to be filtered. For example, a great many materials which are to be filtered comprise crystals of an inorganic salt admixed with a saturated aqueous solution thereof and, in such case, a water insoluble organic compound, e. g. benzene, having a melting point above the temperature at which the salt saturated liquor freezes can be employed. Such an organic compound can be readily dispersed in the material to be filtered and then solidified by cooling.

One method of solidifying the immiscible fluid or liquid which is to form the filter aid is to cool a mixture thereof with the material to be filtered. Thus the immiscible liquid can be dispersed in the material to be filtered, preferably to form an emulsion therein, and then the entire mass can be cooled until the bodies of immiscible liquid solidify. Alternatively, the cooling can be accomplished locally, that is, by cooling the dispersion of immiscible liquid in the material to be filtered just before it reaches the filter mechanism as by refrigerating coils in a transfer conduit or by cooling it in direct contact with a cold filter cake on the filtering mechanism. Suitable emulsifying agents, e. g. soap, alkyl aromatic sulfonates, sulfonated oils, etc. can be added to aid in the dispersion and emulsification of the immiscible liquid in the material to be filtered and to maintain the solidified filter aid in a uniformly dispersed condition.

A preferred method of admixing and solidifying the immiscible liquid in the material to be filtered is by spraying the immiscible liquid in the form of discrete droplets into the material to be filtered after the latter has been cooled to a temperature below the solidification temperature of the immiscible liquid but above the freezing temperature of the mother liquor. In this manner, the droplets of immiscible liquid are solidified as soon as they contact the material to be filtered thereby avoiding the possibility of their coalescence into undesirably large bodies before complete solidification. The size of the droplets of immiscible liquid and hence the size of the filter aid particles can be varied and controlled by employing varying sizes and types of spray nozzles having different sizes and types of openings therein, by varying the pressure impressed upon the spray nozzle, etc., and by other methods, all of which are well known in the art. The nozzle, etc. can be located within or without the body of the material to be filtered.

Generally, the fluid or liquid which is to form the filter aid will solidify readily when the temperature is lowered sufficiently. However, solidification of the fluid or liquid can be caused or promoted by lowering the temperature to the proper freezing point and by agitating or, preferably, seeding the admixture or dispersion of filter-aid-forming fluid and the material to be filtered. Seeding of the cooled dispersion or admixture can be accomplished merely by adding a solid substance, preferably, solidified particles of the same fluid or liquid which is to form the filter aid, to the cooled admixture or dispersion of filter-aid-forming fluid and material to be filtered.

As a general rule, it is preferred that a filter aid be of such structure and weight that it will remain uniformly dispersed in the material to be filtered for a sufficient time to accomplish the filtering operation. Such a desideratum becomes particularly important when large amounts of the material to be filtered are prepared at one time, as in batch operations, and then must stand for a considerable period of time before being filtered. Although the tendency of the instant filter aids to separate from their dispersion in the material to be filtered is normally small because of their originally thorough and uniform dispersion and because of their emulsion-like properties, their dispersion can be even further stabilized by any one of several methods. One such method is to employ an emulsifying agent with the immiscible liquid as heretofore described. This agent will greatly assist in maintaining a uniform dispersion even after the immiscible liquid has been solidified. Another very desirable method is to admix a gas, such as air, nitrogen, etc., with the immiscible liquid before spraying it into the chilled body of material to be filtered as just described. The gas should be admixed under sufficient pressure to ensure that substantial amounts of it will be dissolved in the immiscible liquid. Then, by spraying the immiscible liquid while under an elevated pressure into the material to be filtered, which is at a substantially lower pressure, the gas will expand and be distributed throughout the particles of solidifying immiscible liquid to form particles of filter aid having a sponge-like character and having a lower particle density which will tend to keep them uniformly dispersed in the liquid to be filtered. The gas is prevented from escaping the immiscible liquid bodies by their rapid solidification when contacted in a dispersed state with the cold material to be filtered. The amount of gas employed can be regulated to yield the desired degree of expansion of the filter aid particles and to control their particle density. The gas dispersed in the solidified liquid also imparts a degree of resiliency to the particles which tends to prevent undue attrition and structural collapse on the filter mechanism when a momentarily high pressure is applied thereto.

In order to explain the invention even more fully, it will now be described with particular reference to a process for filtering calcium hypochlorite crystals from their mother liquor.

The art of manufacture of calcium hypochlorite is old and well known. The general method of producing such a compound is to chlorinate a lime slurry whereby the lime is converted to hypochlorite which crystallizes to form a slurry of hypochlorite crystals. The hypochlorite crystals are customarily recovered from the mother liquor by filtration or centrifugation. The mother liquor contains calcium chloride which is objectionable in the final product because it decreases the available chlorine per pound of product and hence is desired to be removed from the product crystals. As is known in the art, the separation of calcium hypochlorite crystals from their mother liquor has long presented an exceedingly difficult problem. In many cases, the hypochlorite crystals are very small and tend to pack on a filter. In other cases, such as with dibasic calcium hypochlorite $$(Ca(OCl)_2 \cdot 2Ca(OH)_2)$$

the crystals are plate-like and will bridge across the pores of the filtering screen, cloth, bed, etc. to effectively prevent further liquor flow therethrough, as stated. The use of conventional filter aids, such as diatomaceous earth, kieselguhr, etc. is objectionable because of the difficulty encountered in removing such filter aid from the filter cake.

In accordance with this invention, a liquid which can be suitably solidified such as by freezing and which is substantially immiscible with the mother liquor of the calcium hypochlorite slurry and in which the calcium hypochlorite is substantially insoluble is admixed or preferably sprayed into the hypochlorite slurry while the slurry is maintained at a temperature below the freezing point of the immiscible liquid but above the freezing point of the slurry, preferably from minus 2° to plus 3° C. Upon passing through the spray mechanism, the immiscible liquid will become divided into many discrete small bodies of liquid which solidify immediately upon contact with the cold hypochlorite slurry. The slurry containing the thus formed filter aid can be passed to a conventional filter. At the filter, the solids, including the filter aid, will form a filter cake thereon. Since the filter aid is predominantly in the form of spherical bodies, it will tend to form a lattice-like accumulation on the filter thereby preventing the calcium hypochlorite crystals from forming a dense, substantially impenetrable filter cake thereon. The plate-like crystals of calcium hypochlorite are prevented from lying flat, one upon the other, by the rounded bodies of filter aid interposed therebetween. Any of the commonly occurring lath-like crystals of calcium hypochlorite are also prevented from forming a dense mat on the filter by the interspersed filter aid. Thus, the passage of mother liquor through the filter cake is substantially increased without increasing the pressure necessary to cause it to pass through the filter.

Among the immiscible liquids which can be employed in the filtration of a hypochlorite slurry are benzene; ditolyl; various cycloaliphatic hydrocarbons such as cyclohexane, cyclooctane, dicyclohexyl, etc; halogenated hydrocarbons such as dibromethane, dichloronaphthalene, etc.; alcohols such as dihydroxy butane, etc. Having a knowledge of the disclosure of this invention, other suitable immiscible liquids can be selected by one skilled in the art upon a consideration of their known properties. The amount of filter aid employed can be from about 0.05 to about 0.2 pound per pound of slurry and, as in other filtration operations, the exact amount can be readily determined by mere routine test. Emulsifying agents, such as sodium stearate can be employed with the immiscible liquid to aid in obtaining a stabilized uniform dispersion of immiscible liquid bodies throughout the liquid to be filtered.

Thus, it is apparent that a filtration process in accordance with this invention employs a fluid or liquid to form a filter aid in situ in the material to be filtered. In so doing, the necessity of admixing a solid filter aid with the material to be filtered is avoided with a resultant increase in the uniformity of the dispersion of filter aid throughout the material to be filtered and a concomitant decrease in the amount of attrition of the filter aid particles and of the solid particles in the material to be filtered. Further, the tendency of a solid filter aid to cake and form large agglomerates when added to a material to be filtered is avoided. Also, the separation of the filter aid and product is very easily and conveniently accomplished.

While the invention has been described in connection with a present, preferred embodiment thereof, it is to be understood that this description is illustrative only and is not intended to limit the invention, the scope of which is defined by the appended claims. Thus, equivalent filter-aid-forming fluids, readily adaptable to specifically encountered conditions, will be obvious to one skilled in the art in possession of this disclosure. Furthermore, it is now obvious when the material to be filtered is organic in character, the fluid or liquid can be inorganic in character. Thus, a rather low melting point organic material may be filtered with a solidified inorganic fluid or liquid. An example illustrative of an inorganic fluid is carbon dioxide.

An interesting embodiment of the invention is possible when employing a vaporizable catalyst which it is difficult, or otherwise undesirable, to remove from a liquid or slurry-like reaction mass. In such instance, the catalyst and reaction mass can be subjected to filtration, employing the catalyst as a filter-aid. Then the catalyst can be vaporized from the filter cake. To render the operation continuous, also facilitating recovery of the catalyst, which oftentimes will be regenerated by the heat of vaporization, the vapors of catalyst can be trapped into a succeeding quantity of reactants.

I claim:

1. In a process for manufacturing calcium hypochlorite wherein an aqueous suspension of calcium hydroxide is chlorinated to produce a slurry of calcium hypochlorite crystals in a mother liquor, the improved method of filtering said crystals from said liquor which comprises admixing the said slurry with an organic liquid selected from the group consisting of benzene, ditolyl, cyclohexane, cyclooctane, dicyclohexyl, dibromethane, dichloronaphthalene and dihydroxy butane, cooling the resulting admixture to a temperature below the freezing point of said organic liquid but above the freezing point of said slurry, causing said organic liquid to solidify into discrete particles capable of acting as a filter aid in said slurry, filtering said liquor from said crystals and said filter aid, warming the resulting filter cake to a temperature above the freezing point of said organic liquid and then separating said crystals from said organic liquid.

2. In a process for manufacturing calcium hypochlorite wherein an aqueous suspension of calcium hydroxide is chlorinated to produce a slurry of calcium hypochlorite crystals in a mother liquor, the improved method of filtering said crystals from said liquor which comprises spraying an organic liquid selected from the group consisting of benzene, ditolyl, cyclohexane, cyclooctane, dicyclohexyl, dibromethane, dichloronaphthalene and dihydroxy butane into said slurry, maintaining said slurry at a temperature above its freezing point but below the freezing point of said organic liquid to thereby obtain a uniform dispersion of solidified filter aid particles in said slurry, filtering said slurry while maintained at said temperature to remove the liquor therefrom, warming the resulting filter cake to a temperature above the freezing point of said organic liquid and then separating said crystals from said organic liquid.

3. The method of claim 2 wherein said liquid is an organic compound having a freezing point at least 5° C. above that of said slurry.

4. The method of claim 2 wherein said liquid is benzene.

5. The method of claim 2 wherein said liquid is cyclohexane.

6. In a process for manufacturing calcium hypochlorite wherein an aqueous suspension of calcium hydroxide is chlorinated to produce a slurry of calcium hypochlorite crystals in a mother liquor, and wherein the said crystals are filtered from the mother liquor, the method of forming a filter aid in said slurry uniformly dispersed therein without any substantial attrition of said filter aid particles when formed or of said crystals which comprises admixing an inert gas under pressure with an organic liquid selected from the group consisting of benzene, ditolyl, cyclohexane, cyclooctane, dicyclohexyl, dibromethane, dichloronaphthalene and dihydroxy butane, spraying and expanding the resulting admixture of gas under pressure and said organic liquid into said slurry maintained under a lower pressure, thereby causing said gas to expand in said organic liquid to form gaseous inclusions therein, and maintaining said slurry at a temperature above its freezing point but below the freezing point of said organic liquid whereby droplets of said organic liquid sprayed into said slurry are solidified before the gaseous inclusions can escape therefrom.

7. The method of claim 6 wherein an emulsifying agent is admixed with said liquid.

8. The method of claim 2 wherein said liquid is ditolyl.

9. The method of claim 2 wherein said liquid is cyclooctane.

10. The method of claim 2 wherein said liquid is dicyclohexyl.

11. In a process for separating mother liquor from an inorganic salt by filtration, wherein a filter aid is employed to increase the efficiency and ease of filtration, the method of forming said filter aid in situ in the material to be filtered, which comprises admixing an inert gas under pressure with an organic liquid; maintaining said mother liquor and inorganic salts at a temperature above its freezing point but below the freezing point of said organic liquid; spraying and expanding the said admixture of gas under pressure and said organic liquid into said mother liquor and inorganic salt maintained under a lower pressure, thereby causing said gas to expand in said organic liquid so as to form gaseous inclusions therein, and whereby droplets of said organic liquid sprayed into said mixture of mother liquor and inorganic salt are solidified before the gaseous inclusions can escape therefrom.

References Cited in the file of this patent

UNITED STATES PATENTS

| Number | Name | Date |
| --- | --- | --- |
| 1,687,703 | Allen | Oct. 16, 1928 |
| 1,770,052 | Voohress | July 8, 1930 |

FOREIGN PATENTS

| Number | Country | Date |
| --- | --- | --- |
| 526,744 | Great Britain | Sept. 25, 1940 |

OTHER REFERENCES

Emulsions and Foams, by Beckman et al., 1941, pages 161–163 and 203.